Figure 1:
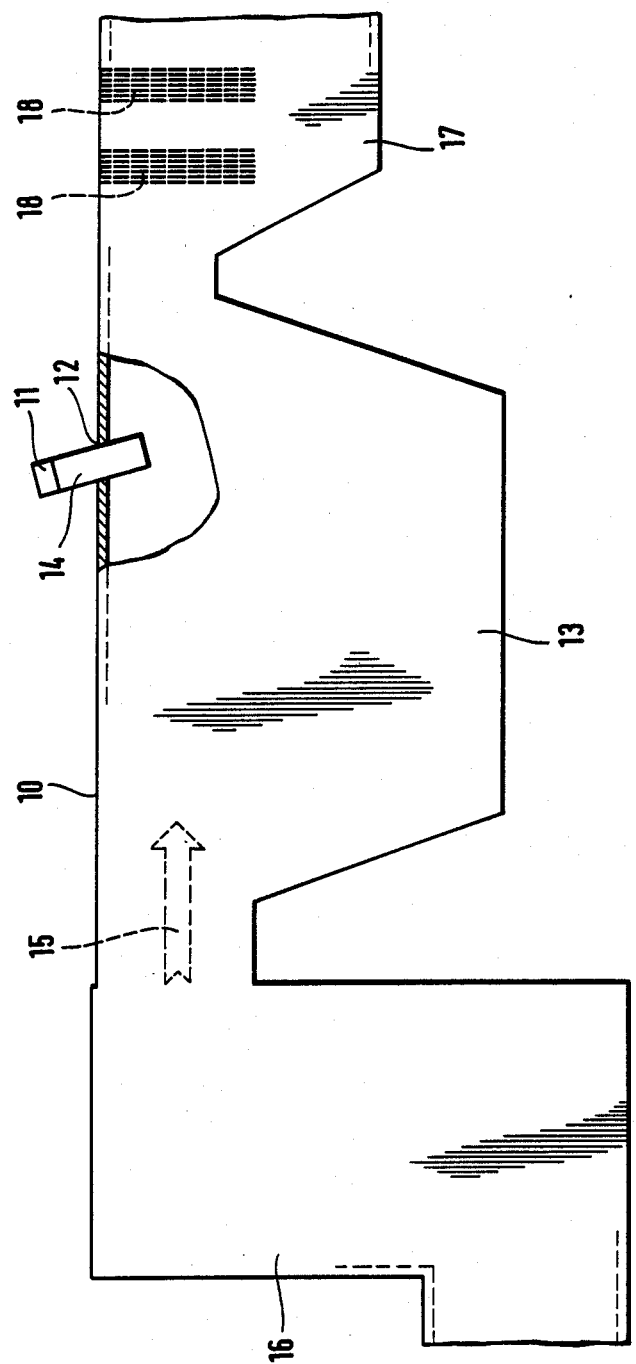

United States Patent [19]

Saarinen

[11] Patent Number: 4,908,058
[45] Date of Patent: Mar. 13, 1990

[54] METHOD AND APPARATUS FOR REDUCING DUST ACCRETIONS WHILE TREATING GASES IN A SMELTING FURNACE

[75] Inventor: Risto U. Saarinen, Espoo, Finland

[73] Assignee: Outokumpu Oy, Helsinki, Finland

[21] Appl. No.: 34,707

[22] Filed: Apr. 6, 1987

[30] Foreign Application Priority Data

May 9, 1986 [FI] Finland .................................. 861937

[51] Int. Cl.4 .............................................. C21B 3/04
[52] U.S. Cl. ......................................... 75/25; 266/155
[58] Field of Search ..................... 75/25, 59.18, 59.17; 266/155, 148, 145, 144; 98/58

[56] References Cited

U.S. PATENT DOCUMENTS

| | | | |
|---|---|---|---|
| 3,480,427 | 11/1969 | Deing et al. | 75/59.18 |
| 4,451,291 | 5/1984 | Leiponen | 266/155 |
| 4,649,807 | 3/1987 | Aasen et al. | 75/25 |

Primary Examiner—S. Kastler
Attorney, Agent, or Firm—Brooks Haidt Haffner & Delahunty

[57] ABSTRACT

The invention relates to a method and apparatus for reducing dust accretions while treating exhaust gases containing sulphur dioxide in smelting furnaces. According to the invention, on the roof (10) of a waste heat boiler connected to a smelting furnace (16), there is placed a nozzle (11), wherethrough some oxygen-bearing gas is conducted into the radiation chamber (13) of the waste heat boiler, which gas brings about a change in the composition of the exhaust gases and simultaneously reduces the accumulation of dust accretions.

11 Claims, 4 Drawing Sheets

METHOD AND APPARATUS FOR REDUCING DUST ACCRETIONS WHILE TREATING GASES IN A SMELTING FURNACE

The present invention relates to a method and apparatus for reducing dust accretions while treating gases in a smelting furnace, particularly as regards the treatment of gases containing sulphur dioxide.

The sulphur dioxide-containing gases discharged from a smelting furnace such as a suspension smelting furnace are first conducted into a waste heat boiler using direct gas flow, which waste heat boiler is divided into two parts, i.e. the radiation chamber and the convection chamber. The purpose of the radiation chamber is to cool off the exhaust gases so that the molten particles contained in the gas are solidified and the temperature declines below the sintering temperature of the particles before the gases are conducted into the convection chamber of the waste heat boiler. In the convection chamber, the remaining heat of the gases is recovered by means of a cooling pipework.

However, owing to the high dust content of the exhaust gases, dust accretions are common in waste heat boilers connected to suspension smelting, and these dust accretions hamper not only the operation of the waste heat boiler but the suspension smelting process as a whole. Manufacturers may suffer remarkable economical losses due to the interruptions in the production caused by these difficulties. The difficulties arising from the existence of dust accretions are mainly the following: the convection cooling pipework in the convection chamber of the waste heat boiler is blocked, the pipe between the waste heat boiler and connected electric filter is blocked, or accretions are accumulated on the emission electrodes of the electric filter.

In the prior art, there have been several attempts to reduce the dust accretions; the cleaning of the boiler has been intensified by aid of shaker arrangements, or special cooling panels parallel to the gas flow have been constructed in the radiation chamber of the waste heat boiler. Further attempts towards diminishing the dust accretions have been made by modifying the design of the waste heat boiler, for instance in the application of the FI patent No. 65632, where a vertical radiation chamber and a corresponding vertical screen chamber are connected to a horizontal convection chamber. In the embodiment of the FI patent No. 66488, the roof of the radiation chamber of the waste heat boiler is constructed to lower gradually so that it is finally joined to the roof of the convection chamber located on an essentially lower level.

Further attempts to reduce the dust accretions have been made by changing the composition of the dust contained in the exhaust gases, for instance according to the procedure introduced in the FI patent No. 61572, where an embrittling agent such as calcium oxide is added into the dust in order to make it more brittle, on the basis of the idea that brittle dust tends to accumulate less accretions on the surface of the convection pipework. So far the suggested methods and arrangements for reducing dust accretions have, however, mainly concentrated on eliminating the symptoms, but there has been no suggestion to eliminate the cause of the trouble.

Thus the purpose of the present invention is to achieve a method and apparatus for reducing the dust accretions created in the gas treatment in suspension smelting, also as regards the reasons leading to the creation of the accretions.

Figure 2:
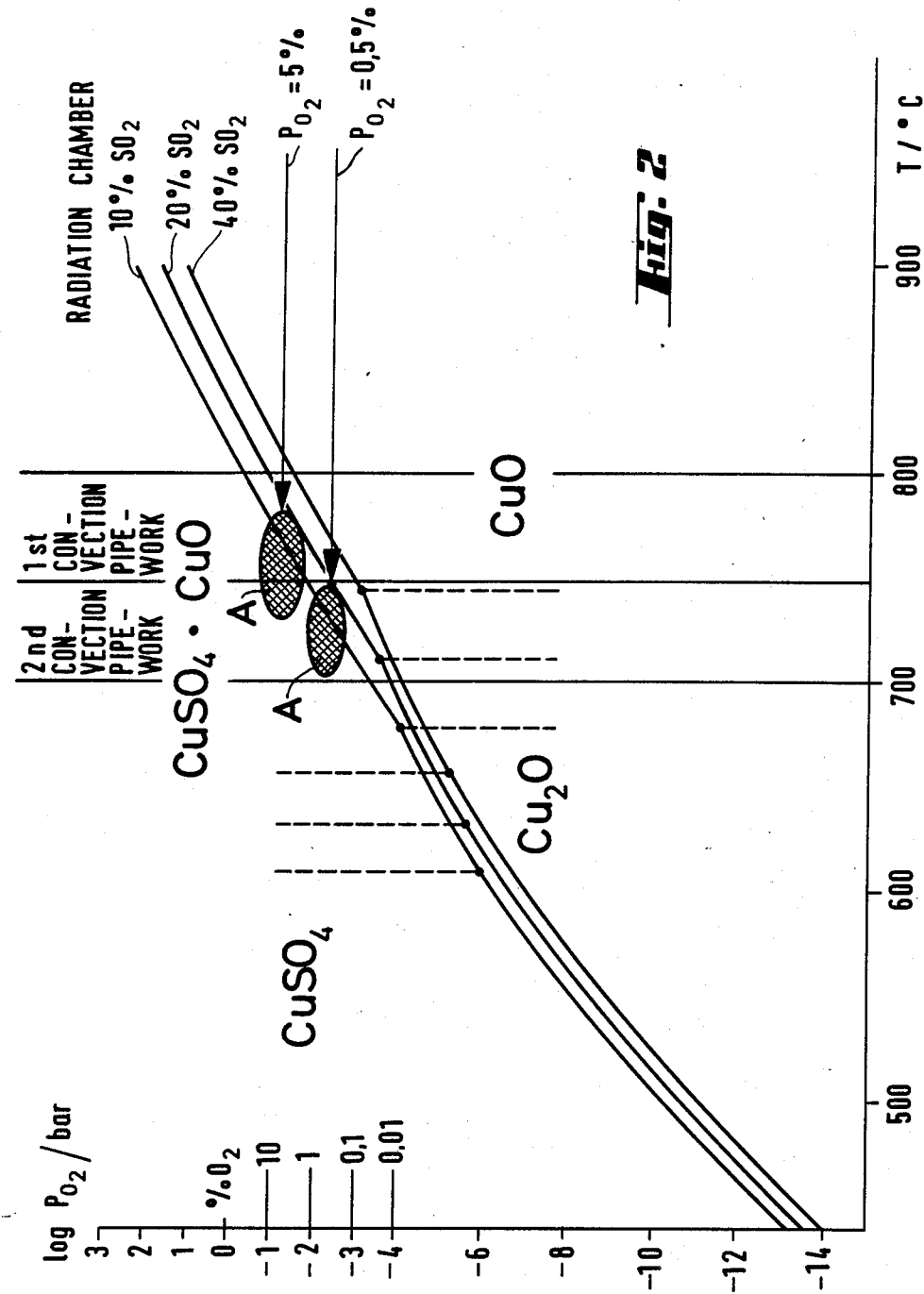

Let us first observe the fly dust obtained from the suspension smelting of copper and the accretions created by the said dust. A common ingredient in these accretions has been copper sulphate $CuSO_4$, wherefore it is apparent that the sulphatizing of the dust is connected to the creation of accretions. The reaction leading to the formation of copper sulphate is as follows:

$$CuO + \tfrac{1}{2}O_2 + SO_2 \rightarrow CuSO_4 \qquad (1)$$

and the balance of the reaction (1) in different temperatures is observed in FIG. 2, where the stable copper sulphate/copper oxide balances are illustrated as a partial pressure parameter of sulphur dioxide, as a function of the temperature in various parts of the waste heat boiler. As is apparent from the figure, the presence of copper sulphate is already registered with very slight oxygen contents, when the temperature is below 800° C. Moreover, FIG. 2 illustrates how the reaction area A of the sulphatizing moves towards the radiation chamber as the oxygen pressure grows. Because the reaction (1) is exothermal, the heat released in the reaction increases the temperature of the product, and owing to the low melting point, i.e. 770° C., of copper sulfate, accretions are easily created. The created accretion, on the other hand, serves in a way as a substrate for new dust accretions.

As is apparent from FIG. 2, the conditions favourable for sulphatizing and the formation of accretions prevail in the vicinity of the beginning of the convection chamber or the end of the radiation chamber. Consequently, if the blocking of the gas treatment line has begun, this leads to a higher underpressure in the electric filter located after the waste heat boiler as well as in the convection chamber of the waste heat boiler, in order to make the disposal of the gases from the suspension smelting furnace possible. This again leads to the growing of the oxygen pressure owing to the increased amount of air leaking into the waste heat boiler, and further to an accelerating rate of blocking caused by the dust accretions and their expansion more into the convection chamber as well as to the ensuing gas conduit and electric filter.

A general practice in the suspenion smelting method has been to use a slight amount of surplus air for the burners of the settler, in which case the oxygen for the sulphate reaction is fed in already from the furnace. However, this method brings about some drawbacks: the gas amount grows, because an extra amount of air is used and heated with extra oil. It may also happen that consequently the radiation chamber proves out to be insufficient, if the temperature of the exhaust gases and dust remains over 800° C. even after the radiation chamber, in which case the sulphatizing, i.e. the creation of dust accretions, takes place only in the convection chamber. Moreover, gas recirculation has been applied for controlling the creation of accretions, in which case the exhaust gases are recirculated into the waste heat boiler. This, however, brings about a substantial flow of warm gas, but at the same time the said circulation gas does not introduce enough oxygen into the radiation chamber of the waste heat boiler.

In the method of the present invention, the sulphatizing, i.e. the creation of dust accretions, is controlled by making use of the temperature and oxygen. According to the invention, into the radiation chamber of the waste heat boiler there is blown through nozzles and at an essentially high speed of 20-90 m/s, preferably 40-70 m/s, some oxygen-bearing gas 10-40% by volume, preferably 15-25% by volume, of the amount of the exhaust gases, so that the oxygen content in the exhaust gases increases and the sulphatizing, i.e. the creation of accretions, is shifted further towards the radiation chamber. As the oxygen-bearing gas blown into the radiation chamber of the waste heat boiler, such as air, oxygen-enriched air or oxygen, advantageously declines the temperature of the gas contained in the radiation chamber, the reaction area moves over to the radiation chamber, wherefrom any created dust accretions can easily be removed without harmful changes in the pressure which should affect the operation of the waste heat boiler.

The apparatus according to the invention advantageously comprises at least one nozzle for blowing oxygen-bearing gas, the said nozzle being advantageously placed on the roof of the waste heat boiler so that the nozzle pipe is in a slanted position with respect to the flowing direction of the gas.

Figure 3:
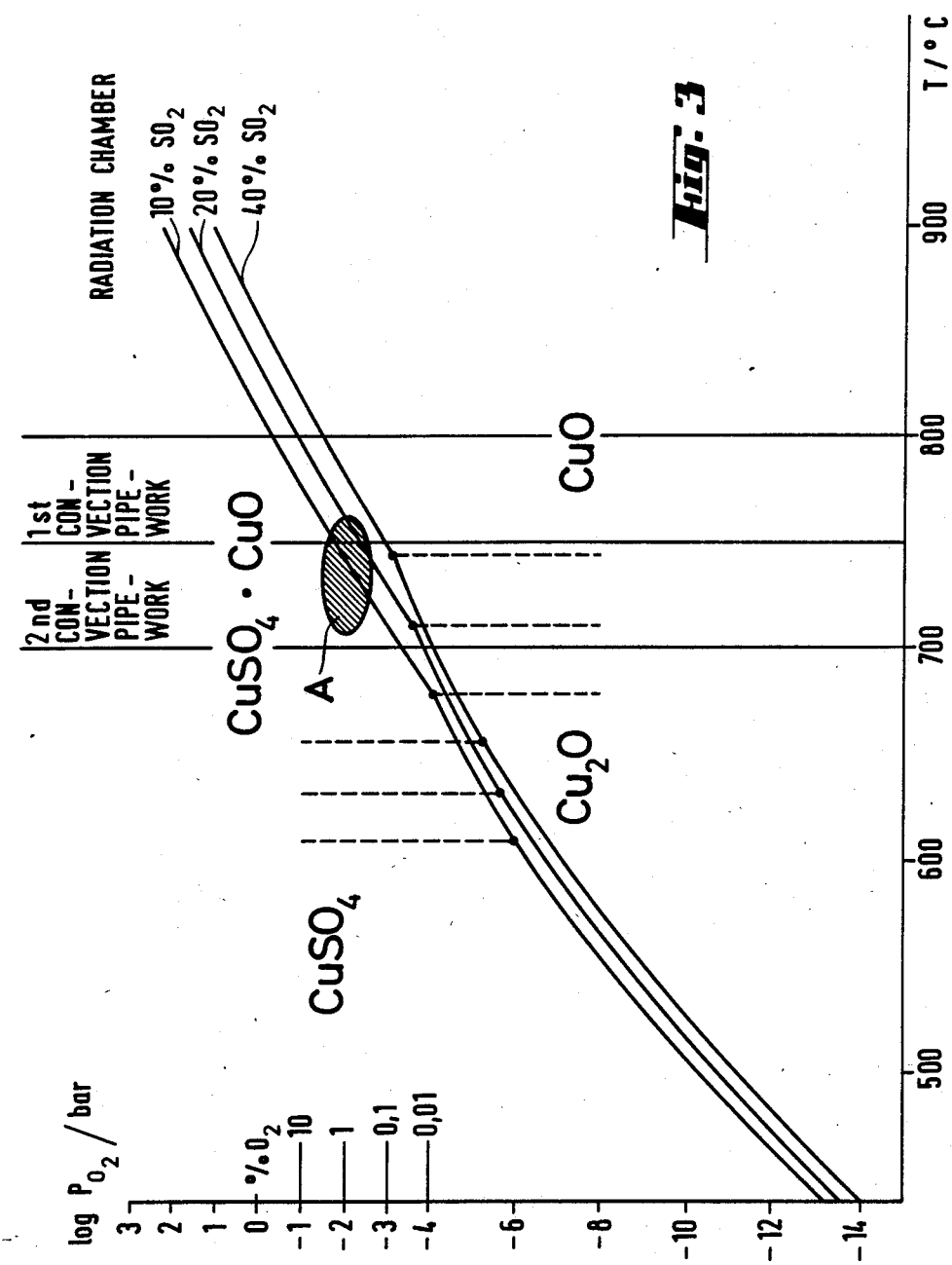
Figure 4:
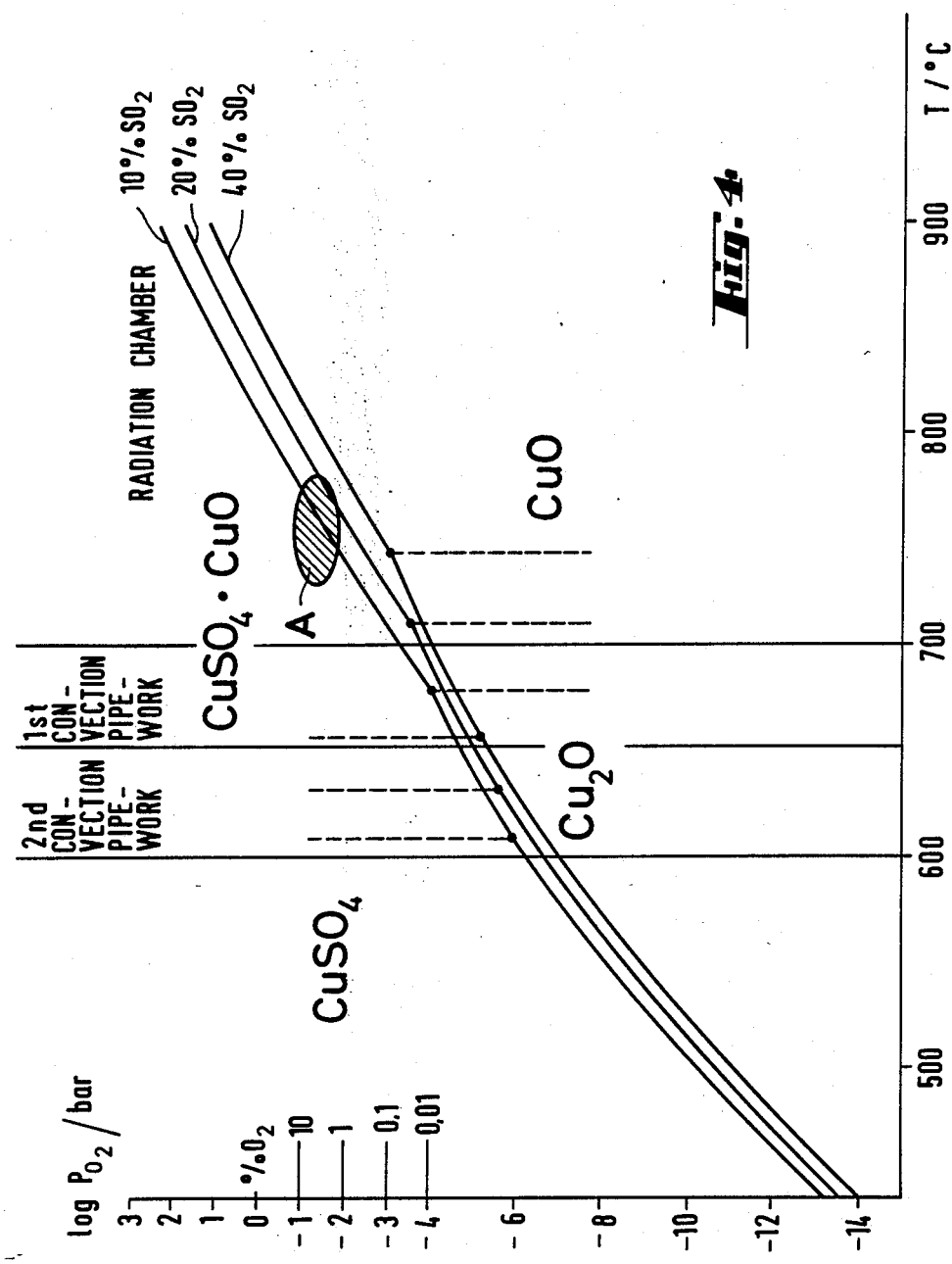

The invention is described in more detail below with reference to the appended drawings, wherein FIG. 1 illustrates a preferred embodiment of the apparatus of the invention in partial side-view cross-section, FIG. 2 illustrates the copper sulphate/copper oxide balance as a function of the temperature with varying partial pressures of sulphur dioxide and oxygen, according to prior art techniques, FIG. 3 illustrates the balance of FIG. 2 in the situation of Example 1, and FIG. 4 illustrates the balance of FIG. 2 when the method and apparatus of the invention are applied according to Example 2.

According to FIG. 1, on the roof 10 of the radiation chamber of a waste heat boiler, advantageously to the far end of the said roof, there is attached a nozzle 11 according to the invention, which nozzle is via the opening 12 connected to the radiation chamber 13 by intermediation of the blowing pipe 14 provided in the nozzle 11. The pipe 14 is installed at an essentially slanted position with respect to the gas flow 15 entering from the smelting furnace 16 into the radiation chamber 13. The pipe 14 forms an angle of 5°-30°, advantageously 10°-20°, with the normal of the gas flow 15. FIG. 1 also illustrates the convection chamber 17 of the waste heat boiler and the convection pipeworks 18 contained therein.

Through the nozzle 11, into the radiation chamber 13 of the waste heat boiler there can be blown some oxygen-bearing gas, such as air, oxygen-enriched air or oxygen, in order to realize the method of the invention. There can also be several nozzles 11 installed on the roof 10 of the radiation chamber, if it is advantageous to blast the required gas amount into different parts of the radiation chamber. However, an advantageous arrangement of the nozzles is that they are at an essentially same point of the roof of the radiation chamber with respect to the longitudinal direction of the roof.

In the following we give examples both of a prior art practice and of the application of the method and apparatus of the present invention into an industrial-scale system.

EXAMPLE 1

A flow of exhaust gases from a smelting furnace proceeded into the radiation chamber of a waste boiler at 30 000 Nm$^3$/h. The sulphur dioxide content of the exhaust gases was 26,7% by volume and their oxygen content was 1,0% by volume. In the prior art practice, the temperature of the exhaust gases after the radiation chamber is 750°-800° C. FIG. 3 illustrates the situation according to this example in a copper sulphate/copper oxide balance system. As is observed from the location of the reaction area A, the sulphatizing, i.e. the creation of accretions is most active within the first and partly the second pipework unit of the convection chamber. As a consequence, there follows a gradual blocking which leads to an increased suction at the far end of the gas line and further to an accelerated blocking effect.

EXAMPLE 2

According to the present invention, into a similar flow of exhaust gases as in Example 1, air was blown to the far end of the radiation chamber through a nozzle placed on the roof of the radiation chamber of the waste heat boiler, at 6000 Nm$^3$/h, i.e. 20% by volume of the total gas amount. Thus the total amount of gases discharged from the radiation chamber was 36 000 Nm$^3$/h. The sulphur dioxide content of the said gas was 22,2% by volume and oxygen content 4,3% by volume, and the temperature of the gases was 680°-700° C. FIG. 4 illustrates the situation according to this example. As is apparent from FIG. 4, the reaction area A has distinctly moved to the radiation chamber, in which case any essential amount of sulphatizing, i.e. creation of accretions, takes place in the radiation chamber, and the system is free of any essential formation of accretions within the convection chamber.

I claim:

1. A method for regulating the sulphatizing of exhaust gases and thus reducing dust accretions in the treatment of sulphur dioxide-containing exhaust gases in a smelting furnace by changing the composition of the exhaust gases, comprising blowing oxygen-bearing gas into the exhaust gases at an angle with respect to a flow of exhaust gases through a radiation chamber of a waste heat boiler for lowering the temperature of gases contained in the radiation chamber to cause sulphatizing to take place in the radiation chamber.

2. The method of claim 1 wherein the oxygen-bearing gas blown in is about 10-40% by volume of the amount of exhaust gases.

3. The method of claim 1 wherein the oxygen-bearing gas blown in is about 15-25% by volume of the amount of exhaust gases.

4. The method of claim 1, 2 or 3 wherein the oxygen-bearing gas is air.

5. The method of claims 1, 2 or 3 wherein the oxygen-bearing gas is oxygen-enriched air.

6. The method of claims 1, 2, or 3 wherein the oxygen-bearing gas is oxygen.

7. The method of claims 1, 2 or 3 wherein the oxygen-bearing gas is blown at a speed of 20-90 meters per second.

8. The method of claims 1, 2, or 3 wherein the oxygen-bearing gas is blown at a speed of 40-70 meters per second.

9. An apparatus for regulating the sulphatizing and thus reducing dust accretions in the treatment of sulphur dioxide-containing exhaust gases in a smelting furnace of the type having a waste heat boiler with a radiation chamber comprising a nozzle arranged in a slanted position with respect to a flow direction of exhaust gases along the length of the radiation chamber for blowing oxygen-bearing gas into the gas flow in the radiation chamber to cool the gases in the radiation chamber and to promote sulphatizing of the gases in the radiation chamber, and wherein the nozzle is directed at an angle of 5°–30° with respect to the exhaust gas flow direction.

10. An apparatus for regulating the sulphatizing and thus reducing dust accretions in the treatment of sulphur dioxide-containing exhaust gases in a smelting furnace of the type having a waste heat boiler with a radiation chamber comprising a nozzle arranged in a slanted position with respect to a flow direction of exhaust gases along the length of the radiation chamber for blowing oxygen-bearing gas into the gas flow in the radiation chamber to cool the gases in the radiation chamber and to promote sulphatizing of the gases in the radiation chamber, and wherein the nozzle is directed at an angle of 10°–20° with respect to the exhaust gas flow direction.

11. An apparatus for regulating the sulphatizing and thus reducing dust accretions in the treatment of sulphur dioxide-containing exhaust gases in a smelting furnace of the type having a waste heat boiler with a radiation chamber comprising a nozzle arranged in a slanted position with respect to a flow direction of exhaust gases along the length of the radiation chamber for blowing oxygen-bearing gas into the gas flow in the radiation chamber to cool the gases in the radiation chamber and to promote sulphatizing of the gases in the radiation chamber, and wherein the nozzle is located at a downstream end of the radiation chamber with respect to the exhaust gas flow.

* * * * *